Oct. 9, 1962   E. P. ANSTETT   3,056,982
METHOD OF BLANKING A NAIL FROM SHEET STOCK
Original Filed Aug. 2, 1956   2 Sheets-Sheet 1
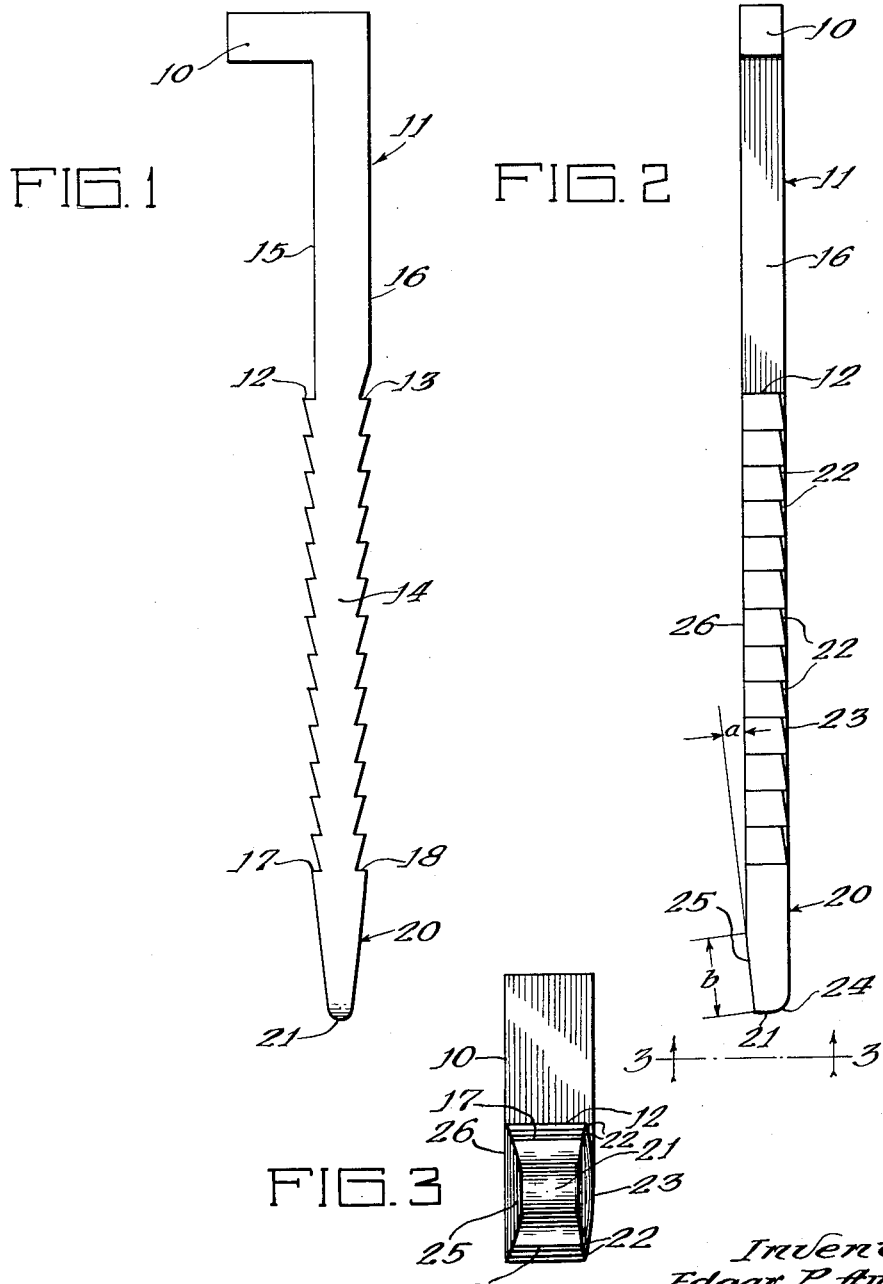

Oct. 9, 1962 E. P. ANSTETT 3,056,982
METHOD OF BLANKING A NAIL FROM SHEET STOCK
Original Filed Aug. 2, 1956 2 Sheets-Sheet 2
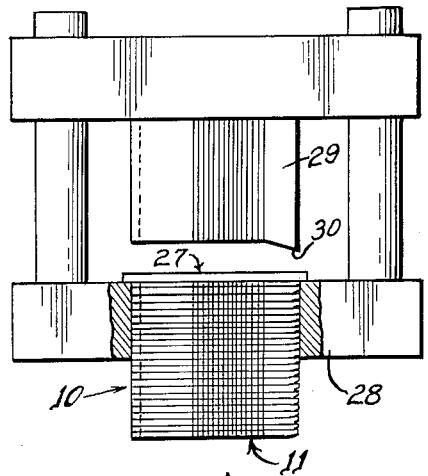
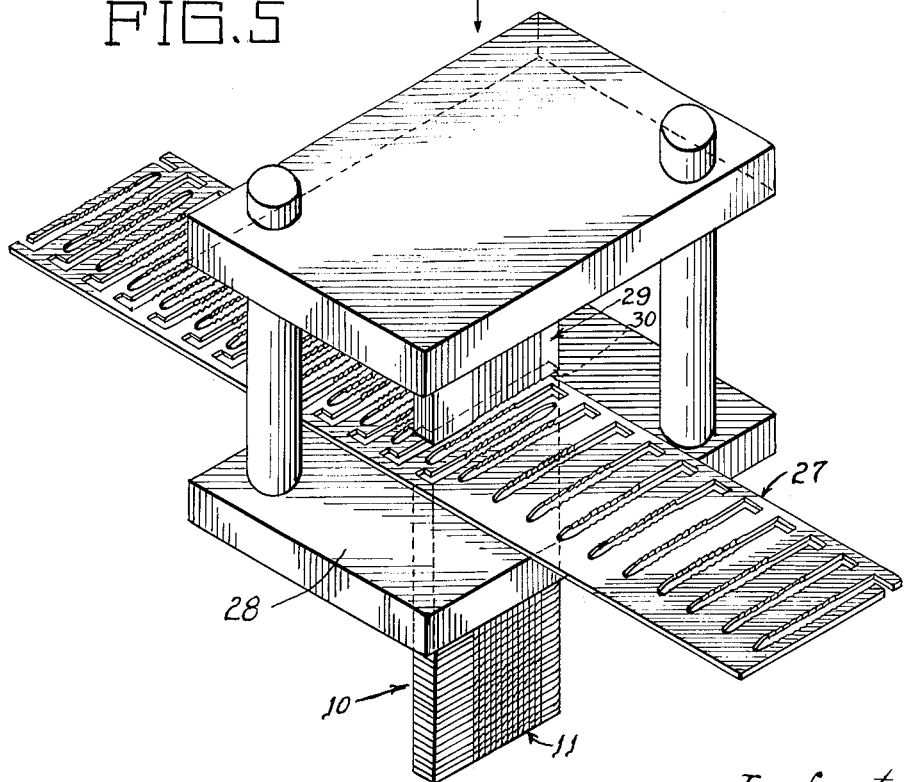
Inventor.
Edgar P. Anstett.
By Schroeder, Hofgren,
Brady & Wegner
Attorneys

United States Patent Office 3,056,982
Patented Oct. 9, 1962

3,056,982
METHOD OF BLANKING A NAIL FROM SHEET STOCK
Edgar P. Anstett, 1309 Ritchie Court, Chicago, Ill.
Original application Aug. 2, 1956, Ser. No. 601,732, now Patent No. 2,868,057, dated Jan. 13, 1959. Divided and this application Nov. 24, 1958, Ser. No. 775,771
2 Claims. (Cl. 10—34)

This invention relates generally to fasteners of the type that are driven, as for example nails, brads, cleats, staples and the like. The invention more particularly relates to a method of making a fastener that is formed from sheet metal stock.

Sheet metal fasteners are now widely used in nailing machines which are adapted to receive a stick of nails in a magazine from which they are driven one at a time by a plunger which is struck by a workman.

Difficulty has been experienced when trying to drive these fasteners into hard wood. The fasteners may bend if they veer slightly off of a true straight line during the driving action. Some types of wood grains have a great tendency to make the fastener follow the grain, thus causing the fastener to curl rather than to remain straight. These problems are accentuated in fasteners of relatively long length as might be used to secure hard wood, tongue and groove flooring in place.

It is the general object of this invention to provide a new and improved method for making a fastener of the type illustrated and described.

Another object is to provide a method of making a fastener structure by a blanking operation without requiring any additional machining operations to provide a fastener structure which will inherently avoid the difficulty previously encountered with such fasteners by combining, in the fastener, excellent holding qualities with proper driving characteristics.

Other objects, features and advantages of the present invention will be apparent from the following description of the method of making a fastener and a specific embodiment of fastener illustrated in the accompanying drawing in which:

FIG. 1 is a plan view of a sheet metal cleat embodying the present invention;

FIG. 2 is a side or edgewise view of the cleat shown in FIG. 1;

FIG. 3 is an end view taken substantially at line 3—3 in FIG. 2.

FIG. 4 is a side elevational view of the punch and die partly in section to show the forming of a plurality of the fasteners illustrated in FIGURE 1 with the proportions of the punch tip exaggerated; and FIG. 5 is a perspective view of the punch and die as illustrated in FIGURE 4.

This application is a division of my application Serial No. 601,732, filed August 2, 1956 now U.S. Patent No. 2,868,057 issued January 13, 1959.

The particular fastener chosen for the purpose of illustrating the present invention is one used in the securing of hard wood flooring in place. The fastener is generally termed a cleat and is stamped or blanked from sheet metal stock. The cleat has an L-shape head portion 10 formed integrally with a body including a shank portion 11 which is slightly wider than thick as shown in comparing FIGS. 1 and 2 respectively. In the specific cleat illustrated, the shank 11 is of generally uniform cross section from the head 10 to the uppermost pair of opposite barbs 12 and 13. The barbs are formed on the extension 14 of the shank 11 and are formed on two opposite sides which are in effect continuations of the sides 15 and 16 of the shank. In the preferred form, the barbs 12 and 13 are the widest apart with the barbs 17 and 18 at the lower end of the fastener being closest together, there being a gradual uniform taper between these respective pairs of barbs. It may be noted that barb 12 extends outwardly of surface 15. It has been found that the tapered barb structure gives the cleat a holding power much greater than other forms of fasteners. The lower or penetrating end 20 of the fastener has a tip 21 rounded in plan and of a particularly important shape in side view.

In blanking the nails from sheet metal stock 27, the metal material is formed in the female die 28 partly within the elastic limit of the material and partly beyond the elastic limit. This results in a known phenomenon of drawing the metal into the female die at least in part. As illustrated in FIGS. 2 and 3, it will be noted that the barb points as illustrated at 22 are drawn inwardly toward the center of the fastener from the outer-most surface 23 of the fastener. This results in the surface 23 being somewhat rounded as seen in FIG. 3.

The drawing of the metal is even more pronounced at the penetrating end of the fastener. The rounded end 24 at the extreme end 21 is due to this drawing action and places quite a rounded surface on the material penetrating end of the fastener. This rounded portion 24 generally cannot be avoided because of the necessity of blanking the cleats from relatively thick sheet metal stock. In the past, the rounded portion 24 has caused the cleats to drive irregularly rather than straight, particularly in hard wood.

The present invention provides a structure which offsets the effect of the rounded portion 24. The surface 25 on the opposite side of the fastener is inclined through an angle "a" to the generally straight side 26 of the fastener by building up the punch 29 in the area 30 of the penetrating point of the cleat. The length of the resulting straight portion 25 generally extends over a distance "b" illustrated in FIG. 2. By forming this offsetting inclined surface on the cleat end, a relatively good symmetry for the penetrating end of the cleat is formed as illustrated in FIG. 3. With this symmetry, the cleats will generally drive straight and true even though the wood receiving the cleat may be hard or have a difficult grain to penetrate.

The foregoing detailed description has been given for clearness of understanding only, and no unnecessary limitations should be understood therefrom, for some modifications will be obvious to those skilled in the art.

I claim:
1. The method of blanking cleats from sheet metal stock in which the cleat has an elongated shank having a width as great as its thickness and a short penetrating end portion with symmetrically tapering lateral edges and a blunt end comprising, disposing sheet metal stock adjacent a female die and over an opening therein contoured to produce the cleat from the stock, said sheet metal stock being of a width greater than the length of said female die so as to overlie the entire opening therein, initially contacting an area of the stock over said female die opening and adjacent the penetrating end of the cleat to be blanked with a built-up area of a punch, progressively indenting said area of the stock for a distance less than the entire length of the penetrating end with the built-up punch area while said stock is supported solely by the female die about the opening therein and continuing such indenting to bring the remainder of the punch into contact with the surface of the cleat to be blanked, and shearing the cleat from the stock by continued movement of the punch toward the female die to blank the cleat from the stock with the cleat having a penetrating end of less thickness than the remainder of the cleat.

2. The method of blanking driven-type fasteners from sheet metal to provide a fastener having generally the thickness of the sheet metal and a width at least as great as its thickness with a penetrating end portion on the fastener including blanked edges tapering symmetrically to the extremity thereof, comprising the steps of positioning sheet metal stock between relatively movable blanking punch and female die members shaped to form the fastener, said sheet metal stock being of a width greater than the length of said female die so as to overlie the entire opening therein, providing the punch member with an outwardly extending portion at the extremity thereof for forming the penetrating end of the fastener providing said female die member with an opening therein, engaging the stock between said blanking members over said female die opening initially only at the extremity of said penetrating end, moving said members toward each other to force said outwardly extending portion of the punch member into the sheet metal stock at the extremity of said penetrating end while said stock is supported soleby by the female die about the opening therein and continuing to force said punch into the stock to bring the remainder of the punch member into contact with the sheet metal stock over said female die opening, then completing the relative movement of the blanking members to shear the fastener from the sheet metal stock, said indented portion of the fastener penetrating end being opposite rounded edges drawn in the opposite side of the fastener by said completed blanking movement of the blanking members.

References Cited in the file of this patent

UNITED STATES PATENTS

| | | |
|---|---|---|
| 189,586 | Tate | Apr. 17, 1877 |
| 410,624 | Wills | Sept. 10, 1889 |
| 2,031,024 | Ahlquist | Feb. 18, 1936 |
| 2,170,473 | Fitch | Aug. 22, 1939 |
| 2,649,831 | Anstett | Aug. 25, 1953 |
| 2,754,907 | Childs | July 17, 1956 |